(12) United States Patent
Bookbinder et al.

(10) Patent No.: US 9,695,081 B2
(45) Date of Patent: Jul. 4, 2017

(54) SURFACE NITRIDED ALKALI-FREE GLASSES

(71) Applicant: CORNING INCORPORATED, Corning, NY (US)

(72) Inventors: Andrea Weiss Bookbinder, Corning, NY (US); Dana Craig Bookbinder, Corning, NY (US); Timothy Michael Gross, Corning, NY (US); Pushkar Tandon, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 58 days.

(21) Appl. No.: 14/710,130

(22) Filed: May 12, 2015

(65) Prior Publication Data

US 2015/0329408 A1 Nov. 19, 2015

Related U.S. Application Data (60) Provisional application No. 61/993,488, filed on May 15, 2014.

(51) Int. Cl.
*C03C 21/00* (2006.01)
*C03C 3/091* (2006.01)
(Continued)

(52) U.S. Cl.
CPC .............. *C03C 3/045* (2013.01); *C03C 3/06* (2013.01); *C03C 3/091* (2013.01); *C03C 3/111* (2013.01); *C03C 21/007* (2013.01); *C03C 23/007* (2013.01); *C03C 2201/02* (2013.01); *C03C 2201/24* (2013.01); *Y10T 428/315* (2015.01)

(58) Field of Classification Search
CPC .............................. C03C 21/00; C03C 21/007
See application file for complete search history.

(56) References Cited

U.S. PATENT DOCUMENTS

| | | | | |
|---|---|---|---|---|
| 5,045,508 A | * | 9/1991 | Brow | ........................ C03C 3/16 501/45 |
| 5,098,792 A | * | 3/1992 | Sebastiano | .......... C03C 23/0055 427/165 |

(Continued)

FOREIGN PATENT DOCUMENTS

| | | | | |
|---|---|---|---|---|
| DE | 102004011117 | | 9/2005 | |
| DE | 102004011117 A1 | * | 9/2005 | ............. C03C 3/091 |

(Continued)

OTHER PUBLICATIONS

Kozii, O.I. et al. "Nitriding of Industrial Glass Surface." Glass and Ceramics, vol. 61, Nos. 9-10, (2004):328-330.

(Continued)

*Primary Examiner* — David Sample
(74) *Attorney, Agent, or Firm* — John T. Haran (57) ABSTRACT

Alkali-free glasses are disclosed having (in weight %) $50 \leq SiO_2 \leq 80\%$, $2 \leq Al_2O_3 \leq 17\%$, $8 \leq B_2O_3 \leq 36\%$, and greater than or equal to 2% and less than or equal to 25% of at least one of CaO, MgO, BaO, SrO or ZnO. The alkali-free glasses can have a surface layer with greater than 0.2 weight % N. Such alkali-free glasses are achieved by nitriding processes and exhibit increased strength, scratch resistance and chemical durability.

39 Claims, 6 Drawing Sheets

(51) Int. Cl.
*C03C 3/11* (2006.01)
*C03C 3/04* (2006.01)
*C03C 3/06* (2006.01)
*C03C 23/00* (2006.01)

(56) References Cited

U.S. PATENT DOCUMENTS

| | | |
|---|---|---|
| 2002/0151426 A1 | 10/2002 | Murata et al. |
| 2008/0066497 A1 | 3/2008 | Weber et al. |
| 2011/0318555 A1 | 12/2011 | Bookbinder et al. |
| 2012/0135852 A1 | 5/2012 | Ellison et al. |
| 2012/0135853 A1 | 5/2012 | Amin et al. |

FOREIGN PATENT DOCUMENTS

| | | | |
|---|---|---|---|
| JP | 01157437 A * | 6/1989 | ............. C03C 17/23 |
| JP | 2003335548 | 5/2002 | |
| JP | 2008308343 | 12/2008 | |

OTHER PUBLICATIONS

Yashchishin, I.N. et al. "Influence of Gas-Thermal Nitridation of Optical Lead Silicate Glass on Its Surface Properties."Glass Physics and Chemistry, vol. 27, No. 5, (2001): 470-473.

Loehman, Ronald E.. "Oxynitried Glasses," Journal of Non-Crystalline Solids, 42, (1980) :433-446.

Frischat, G.H. et al. "Preparation of Nitrogen-Containing Na2O—CaO—SiO2 Glasses," Journal of American Ceramic Society-Discussions and Notes. vol. 63, No. 11-12, (1980): 714-715.

Yashchishin, I.N. et al. "Surface Nitrogen Doping of Optical Glasses." Glass and Ceramics, vol. 54 Nos. 1-2, (1997): 6-8.

Joydeb Mukerji et al. "Properties of Glass and Melts in the System MgO—AlN—SiO2", American Ceramic Society Bulletin, vol. 66, No. 11, Nov. 1, 1987, pp. 1616-1619.

Loehman et al. "Preparation and Properties of Oxynitride Glasses," Journal of Non-Crystalline Solids, North-Holland Physics Publishing. Amsterdam, NL, vol. 56, No. 1-3, Jul. 1, 1983, pp. 123-134.

Wusirika, R. "Reaction of Ammonia with Fumed Silica", Journal of the American Ceramic Society, Blackwell Publishing, vol. 73, No. 10, Oct. 1, 1990, pp. 2926-2929.

Deriano S et al. "Mechanical Strength Improvement of a Soda-Lime-Silica Glass by Thermal Treatment Under Flowing Gas", Journal of the European Ceramic Society, Elsevier Science Publishers, vol. 24, No. 9, Aug. 1, 2004, pp. 2803-2812.

Patent Cooperation Treaty International Notification of Transmittal of the International Search Report and the Written Opinion of the International Searching Authority, international application No. PCT/US2015/030445: mailing date Jul. 24, 2015, 16 pages.

\* cited by examiner

SURFACE NITRIDED ALKALI-FREE GLASSES

CROSS-REFERENCE TO RELATED APPLICATIONS

This application claims the benefit of priority under 35 U.S.C. §119 of U.S. Provisional Application Ser. No. 61/993,488 filed on May 15, 2014 the content of which is relied upon and incorporated herein by reference in its entirety.

BACKGROUND

The present disclosure relates to surface nitrided alkali-free glasses. The disclosure also relates to articles made from such glasses, and methods for obtaining such glasses and related articles.

Glass sheets or panels are finding increased use in devices with "touch" capability. Glass sheets that are used in touch devices can be formed by different methods, including fusion draw process, float process, etc. The glass sheets made by the foregoing processes inherently have only moderate intrinsic strength and scratch resistance. Since the devices which employ touch applications involve heavy handling and usage, the moderate intrinsic strength and scratch resistance are not sufficient for the glasses to be robust in these environments. Thus, there is an immediate and critical need for glasses with higher strength and scratch resistance.

SUMMARY

Compositions and articles disclosed herein provide alkali-free glasses exhibiting improved strength (including edge strength), scratch resistance and chemical durablity properties. "Alkali-free" as used herein means alkali metals were not intentionally added although trace amounts may be present as contaminants.

In accordance with one embodiment, articles including alkali-free glass with improved strength, scratch resistance and chemical durablity are provided. Articles with the foregoing characteristics may be formed by exposing post-formed alkali-free glass sheets to a gas environment including at least one nitrogen-containing compound at high temperatures to nitride the glass sheet surface and edges. Surface nitriding solves the problems of weak edge strength from exposed tension layer(s) on cut strengthened glass, cut fusion laminate glass or thermally tempered glass, as well as low strength flaws on unstrengthened glass. Methods disclosed herein are compatible with low-cost, large-scale manufacturing of glass sheets, which may be used in low-cost, high-performance touch panel devices. For example, surface nitrided alkali-free glass sheets (e.g., Eagle XG® glass and Lotus™ glass) may be used for touch applications and made in thin film transistor (TFT) fabrications. The presently disclosed glasses are particularly well-suited to indium tin oxide (ITO) touch application in TFT fabrications in which there is excess manufacturing capacity, but alkali glass cannot be used due to concerns of contaminating the fabrication.

Glass articles in accordance with the present disclosure may be planar, such as sheets, or three-dimensional bodies, such as a bottle, vial, etc. Glass sheets can be monoliths or may be employed as one or more layers of a multi-layer glass laminate. The glass sheets may also have 3D formats. Surface nitrided strengthened glass that has been cut to expose unstrengthened edge(s) and fusion laminated glass sheets are also disclosed.

The glass compositions may include phosphate and borate glasses that have a tendency to incorporate higher amount of nitride during the nitriding process.

In accordance with one embodiment, alkali-free glasses which may be suitable for nitriding, or have been subjected to nitriding, in accordance with the present disclosure may include in weight percent $50 \leq SiO_2 \leq 80\%$, $2 \leq Al_2O_3 \leq 17\%$, $8 \leq B_2O_3 \leq 36\%$, and greater than or equal to 2% and less than or equal to 25% of at least one of CaO, MgO, BaO, SrO or ZnO. The alkali-free glasses can also include in weight percent 0-5% other minor components excluding alkali metals.

In accordance with another embodiment, alkali-free glasses which may be suitable for nitriding, or have been subjected to nitriding, in accordance with the present disclosure may include in weight percent on an oxide basis $65 \leq SiO_2 \leq 75\%$, $7 \leq Al_2O_3 \leq 13\%$, $5 \leq B_2O_3 \leq 36\%$, $5 \leq CaO \leq 15\%$, $0 \leq BaO \leq 5\%$, $0 \leq MgO \leq 3\%$ and $0 \leq SrO \leq 5\%$.

In yet a further embodiment, alkali-free glasses which may be suitable for nitriding, or have been subjected to nitriding, in accordance with the present disclosure may include $P_2O_5$, which may provide more efficient nitriding. Such $P_2O_5$ containing alkali-free glasses may include in weight percent on an oxide basis $40 \leq SiO_2 \leq 70\%$, $0 \leq Al_2O_3 \leq 20\%$, $1 \leq P_2O_5 \leq 15\%$, $0 \leq B_2O_3 \leq 25\%$, and greater than or equal to 0% and less than or equal to 25% of at least one of CaO, MgO, BaO, SrO or ZnO.

In still another embodiment, alkali-free glass which may be suitable for nitriding, or has been subjected to nitriding, in accordance with the present disclosure is comprised essentially of at least 99.9% (in weight %) pure silica ($SiO_2$). "Pure silica" as used herein means silicon dioxide to which other materials were not intentionally added although trace amounts may be present as contaminants.

Methods are disclosed for strengthening alkali-free glasses disclosed herein. In one embodiment, a method of strengthening an alkali-free glass composition includes nitriding the surface and/or edges of a glass sheet in which the sheet is exposed to a plasma or heated gas mixture, wherein the gas mixture includes of at least one nitrogen containing compound such as $N_2$, $NH_3$, forming gas ($N_2 + H_2$) or mixture thereof.

Other aspects, features, and advantages will be apparent to one skilled in the art from the description herein taken in conjunction with the accompanying drawings.

DESCRIPTION OF THE DRAWINGS

For the purposes of illustration, one or more embodiments are shown in the drawings, it being understood, however, that the embodiments disclosed and described herein are not limited to the precise arrangements and instrumentalities shown.

DETAILED DESCRIPTION

Various embodiments disclosed herein are directed to alkali-free nitride strengthened glasses. In order to provide a fuller understanding of how the discoveries herein were achieved, and therefore the broad scope of the contemplated embodiments, a discussion of certain experimentation and/or theory will be provided. It is noted, however, that the embodiments herein are not necessarily limited to any such experimentation and/or theory.

General Structure and Considerations

Figure 1:
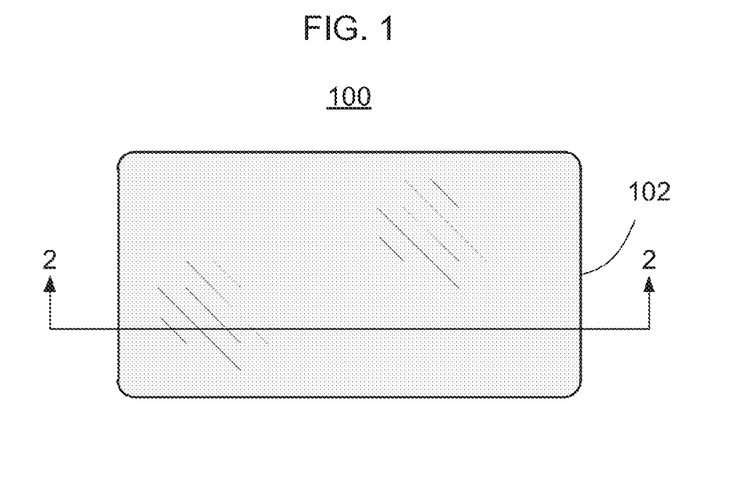
FIG. 1 is a schematic view of an alkali-free glass substrate with a nitrogen-containing layer in accordance with one or more embodiments disclosed herein.

With reference to FIG. 1, a structure 100 may include an alkali-free glass article 102 of interest in connection with the development of novel processes and structures to improve the strength, scratch resistance and chemical durability properties of the alkali-free glass article 102.

Figure 2:
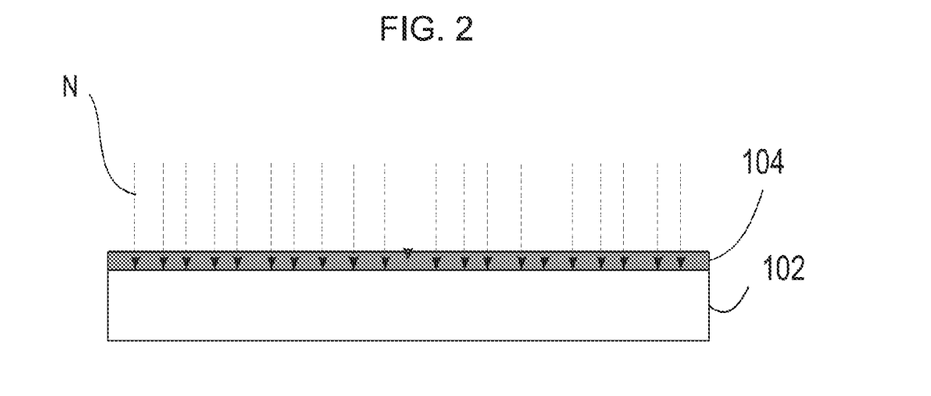
FIG. 2 is a schematic, side view of the glass substrate of FIG. 1 taken through cross-sectional line 2-2 indicating nitriding of a surface.

With reference to FIG. 2, one or more embodiments herein provide for a structure 100 having an alkali-free glass article 102 with a nitrogen-containing layer 104. In a broad aspect, the structure 100 includes the alkaline-free glass article 102 and at least one nitrogen-containing layer 104 substantially covering at least a portion of a surface of the article 102. It is noted that the phrase "substantially covering" herein means that the superior layer (i.e., the layer 104) overlies the inferior layer (i.e., a surface of the article 102). In one or more embodiments, the layer 104 may be disposed on any or all of the sides of the article 102.

In the illustrated examples, the alkali-free-glass article 102 is substantially planar, although other embodiments may employ a curved or otherwise shaped or sculpted article 102 (e.g., a three-dimensionally (3D) shaped glass article). Additionally or alternatively, the thickness of the article 102 may vary, for aesthetic and/or functional reasons, such as employing a higher thickness at edges of the article 102 as compared with more central regions.

Methods

Nitrided glass articles as described herein may be formed by exposing post-formed alkali-free glass sheets to a heated gas mixture including ammonia to nitride the article surface and edges. The gas mixture including ammonia may include other gases such as nitrogen, forming gas ($N_2+H_2$), etc. Nitriding of the glass surfaces creates a diffusion layer of nitride into the surface by exchanging O in the network for N, and unlike a sputtered coating (e.g., sputtering SiON or AlN), without being confined to a single theory, it is believed this nitride diffusion layer does not create surface flaws and/or reduces existing flaws in the glass surface by blunting them.

The mole fraction of ammonia in the gas mixture may be between 0.02 and 1, in some embodiments between 0.05 and 0.8 and in other embodiments between 0.1 and 0.6. In yet other embodiments, a mixture of ammonia and nitrogen is used for nitriding, wherein the ratio of ammonia to nitrogen is between about 10:1 to 1:20. In some embodiments the gas composition flowed to the furnace is 100% ammonia. In other embodiments, the gas composition flowed to the furnace is 5% ammonia/95% $N_2$. The composition of gas in the furnace is typically in the range of 5-100% $NH_3$. In some cases, when flowing 100% $NH_3$ to the furnace the $NH_3$ may partially decompose to $N_2+H_2$, so there may be between 30 to 90% $NH_3$ in the furnace, with the remainder being $N_2+H_2$ (1:3 ratio).

In general the flow rate of gas to the furnace in terms of volumetric turnovers per hour is in the range of 0.2 to 10. The furnace pressure in terms of atmospheres (absolute) is in the range of 1 to 20. In one example, at a pressure of 1 atmosphere the flow rate may be in the range of about 2-8 turnovers per hour. In another example at a pressure of 100 psig the flow rate may be about 1 turnover per hour.

In some embodiments, the nitriding temperature is between the strain point and the anneal point of the glass. In some other embodiments, the nitriding temperature is less than 100° C. above the anneal point of the glass and in yet other embodiments, the nitriding temperature is less than 50° C. above the anneal point of the glass. In various embodiments the nitriding temperature may fall within a range. For example, the nitriding temperature may be from about 200° C. to about 1200° C. In one embodiment the temperature is from about 300° C. to about 525° C. In another embodiment the temperature is from about 350° C. to about 425° C.

Exposure to nitriding gas may be for extended time periods. The nitriding process exposure time may range from about 24 hours to about 240 hours. For example in one embodiment the nitriding process was conducted for 24 hours. In another embodiment, the process was conducted for 168 hours. In yet another embodiment, the process was conducted for 240 hours.

As a result of the nitriding process, the outer layer of the glass surfaces and edges undergo a reaction to form SiON, SiN, AlON, AlN, BON, BN, etc., i.e., Si—N, Al—N, B—N bonds are formed wherein the Si, Al, B, may also be bonded to oxygen in the nitrided layer. The top portion of the glass is transformed from an oxide into a nitride or oxy-nitride layer.

Figure 3:
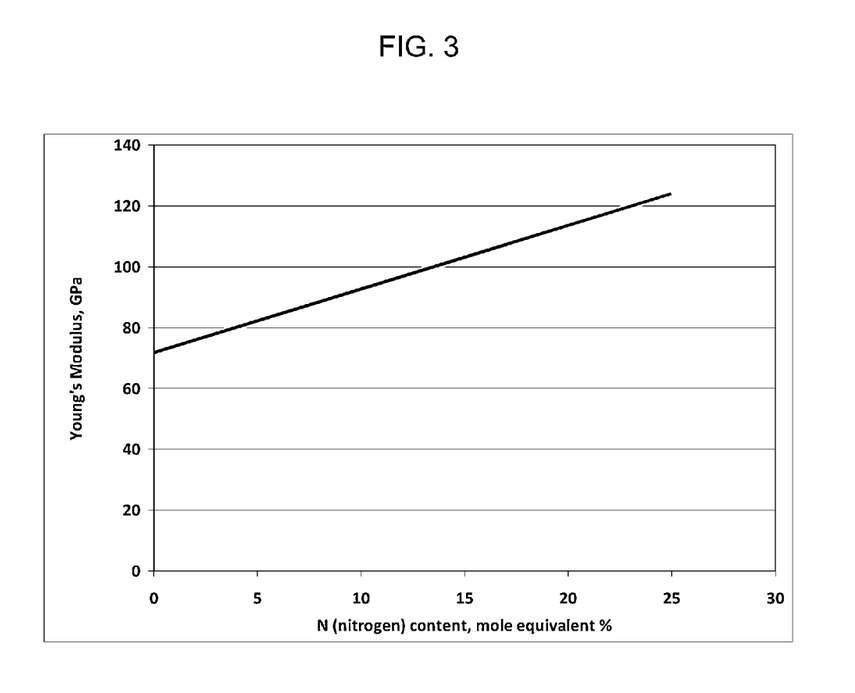
FIG. 3 is a graphical depiction of the sensitivity of glass Young's Modulus in the nitrided layer based on the N content.

It was surprisingly found that alkali-free glasses were amenable to nitriding. As noted, nitriding by its nature involves replacing at least some of the oxygen atoms of the workpiece with nitrogen atoms. In alkali-free glasses, the oxygen atoms are held more tightly than in alkali-containing glasses. One skilled in the art would not expect that alkali-free glasses could be effectively nitrided, let alone achieve improved strength and scratch resistance. Now referring to FIG. 3, nitrided alkali-free glasses made according to the disclosed methods exhibited an increase in modulus as a function of N concentration in the nitrided glass, which in turn improves the strength and scratch resistance performance of the glass.

Glass Compositions and Examples

Alkali-free glasses 102 are disclosed having (in weight %) $50 \leq SiO_2 \leq 80\%$, $2 \leq Al_2O_3 \leq 17\%$, $8 \leq B_2O_3 \leq 36\%$, and greater than or equal to 2% and less than or equal to 25% of at least one of CaO, MgO, BaO, SrO or ZnO. In this embodiment the composition may further include 0-5% other minor components excluding alkali metals. Other minor components in the composition may include for example $ZrO_2$, $Fe_2O_3$, etc. These glass embodiments include alkali-free borosilicate, alkali-free boroaluminosilicate, and alkali-free aluminosilicate glasses.

In accordance with another embodiment, alkali-free glasses include in weight percent on an oxide basis $65 \leq SiO_2 \leq 75\%$, $7 \leq Al_2O_2 \leq 13\%$, $5 \leq B_2O_3 \leq 36\%$, $5 \leq CaO \leq 15\%$, $0 \leq BaO \leq 5\%$, $0 \leq MgO \leq 3\%$ and $0 \leq SrO \leq 5\%$.

In yet a further embodiment, alkali-free glasses include $P_2O_5$, which may provide more efficient nitriding. Such $P_2O_5$-containing alkali-free glasses may include in weight percent on an oxide basis $40 \leq SiO_2 \leq 70\%$, $0 \leq Al_2O_2 \leq 20\%$, $1 \leq P_2O_5 \leq 15\%$, $0 \leq B_2O_3 \leq 25\%$, and greater than or equal to 2% and less than or equal to 25% of at least one of CaO, MgO, BaO, SrO or ZnO.

In still other embodiment, alkali-free glass which may be suitable for nitriding, or has been subjected to nitriding, in accordance with the present disclosure is comprised essentially of pure silica ($SiO_2$). In other embodiments, alkali-free glasses which may be suitable for nitriding, or have been subjected to nitriding, in accordance with the present disclosure may include a molar volume greater than 26 $cm^3$/mole. In another embodiment, such glasses may have a molar volume greater than 27 $cm^3$/mole.

Non-limiting examples of some alkali-free glasses are shown in Table 1 and are shown in both weight percent (wt. %) and mole percent (mole %). The data in Table 1 also show the total amount of RO (CaO, MgO, BaG, SrO and ZnO) and the molar volume of these glasses (NA refers to "not available"). In some embodiments, the summed of RO is in the range from 9 to 24 weight %. In addition, examples of alkali-containing soda-lime silicate glass are shown for comparison. The alkali-containing soda-lime silicate glass has a molar volume of 23.3 $cm^3$/mole, while the alkali-free glasses shown have molar volumes greater than 26 $cm^3$/mole.

yet another embodiment the nitrogen-containing layer includes at least 2 wt % N. In other embodiments, the nitrogen-containing layer includes greater than at least 4 wt % N. In another embodiment, the nitrogen-containing layer includes at least 8 wt % N. In still a further embodiment the nitrogen-containing layer 104 includes at least 14 wt % N.

The glass compositions described above may be in the form of sheets, including but not limited to 3D sheets. The glass compositions may be tempered/strengthened chemically and/or thermally. The glass sheets can be monoliths or may be employed as one or more layers of a multi-layer glass laminate. In some embodiments the thickness of the glass sheet is less than 5 mm, in other embodiments the thickness of the glass sheet is less than 2 mm, in other embodiments the thickness of the glass sheet is less than 1 mm and in other embodiments the thickness of the glass sheet is less than 1 mm and greater than 10 microns. In some embodiments the area of each of the major surfaces of the glass sheet is greater than 2 square centimeters, in other embodiments the area of each of the major surfaces of the glass sheet is greater than 30 square centimeters, in other embodiments the area of each of the major surfaces of the glass sheet is greater than 100 square centimeters, and in other embodiments the area of each of the major surfaces of the glass sheet is greater than 500 square centimeters. In some embodiments thickness of the glass sheet is less than 1 mm and the area of each of the major surfaces of the glass sheet is greater than 30 square centimeters.

It may be advantageous to impart any number of functional properties to a substrate, such as a glass substrate by

TABLE 1

| | Glass | | | | | | | | | |
|---|---|---|---|---|---|---|---|---|---|---|
| | B | | C | | D | | E | | Soda-lime silicate | |
| Component | wt. % | mole % | wt. % | mole % | wt. % | mole % | wt. % | mole % | wt. % | mole % |
| SiO2 | 60 | 66 | 59 | 67 | 53 | 67 | 63 | 67 | 73 | 71.4 |
| Al2O3 | 17 | 11 | 16 | 11 | 14 | 11 | 17 | 11 | 0 | 0 |
| B2O3 | 8 | 8 | 11 | 10 | 9 | 10 | 11 | 10 | 0 | 0 |
| CaO | 4 | 5 | 6 | 7 | 0 | 0 | 7 | 9 | 9 | 9.4 |
| MgO | 3 | 5 | 0 | 0 | 0 | 0 | 1 | 2 | 4 | 5.8 |
| SrO | 8 | 5 | 3 | 2 | 0 | 0 | 1 | 1 | 0 | 0 |
| BaO | 0 | 0 | 5 | 2 | 24 | 12 | 0 | 0 | 0 | 0 |
| ZnO | 0 | 0 | 0 | 1 | 0 | 0 | 0 | 0 | 0 | 0 |
| Na2O | 0 | 0 | 0 | 0 | 0 | 0 | 0 | 0 | 14 | 13.3 |
| RO sum | 15 | 15 | 15 | 12 | 24 | 12 | 9 | 12 | 13 | 15.2 |
| molar volume, $cm^3$/mole | 26.4 | | 27.8 | | NA | | 27.3 | | 23.3 | |

Figure 4:
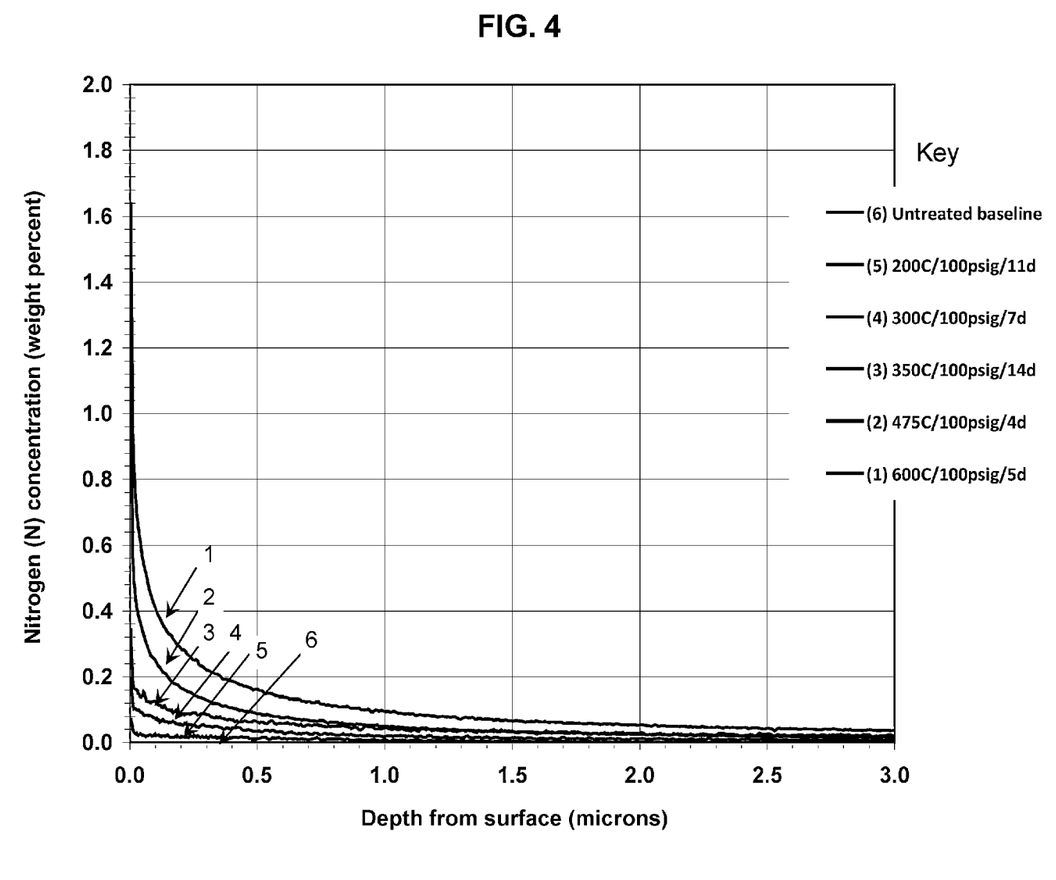
FIG. 4 is a graphical depiction of weight percent nitrogen (N) as a function of depth from the surface for a 1 mm thick silica sheet (Glass A) treated with $NH_3$, as measured by secondary ion mass spectroscopy (SIMS)
Figure 5:
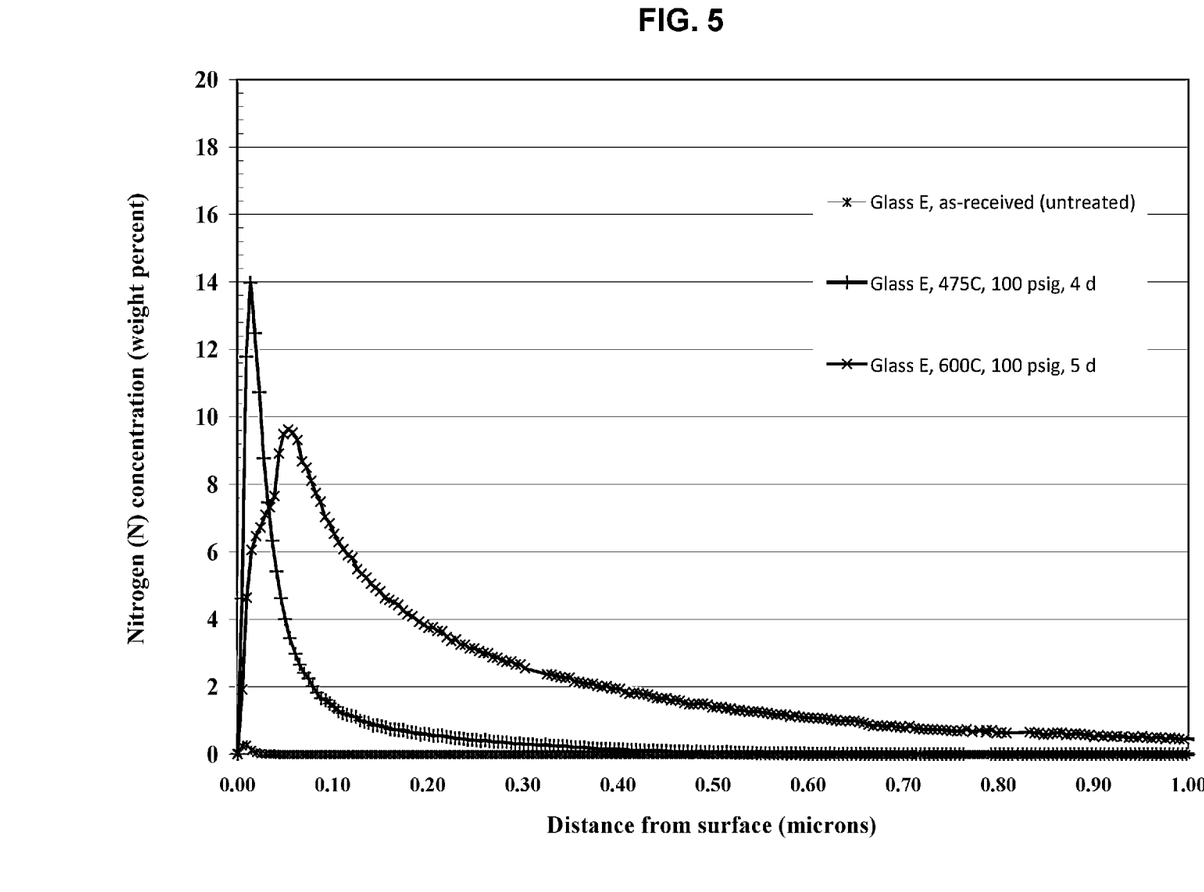
FIG. 5 is a graphical depiction of weight percent nitrogen (N) as a function of depth from the surface for a 0.7 mm thick alkali-free sheet (Glass E) treated with $NH_3$, as measured by secondary ion mass spectroscopy (SIMS)

With reference to FIGS. 4-5, in some embodiments, upon being subjected to nitriding processes described herein, the foregoing alkali-free glass compositions include a nitrogen-containing layer 104 which includes greater than 0.2 wt % N.

In one embodiment the nitrogen-containing layer has a thickness of greater than 1 nm. In another embodiment the thickness of the nitrogen-containing layer is greater than 10 nm. In another embodiment the thickness of the nitrogen-containing layer is greater than 100 nm. In yet another embodiment the thickness is greater than 1 micron. In still another embodiment the thickness is greater than 10 microns. Thickness ranges may include at least one of: (i) from 10-100 nm; (ii) from 100 nm-1 micron; (iii) from 1 micron-10 microns; and (iv) from 10-100 microns.

In one embodiment the nitrogen-containing layer 104 includes greater than 0.2 wt % N. In another embodiment the nitrogen-containing layer includes greater than 1 wt % N. In applying a layer to the substrate. Although the advantageous functional properties achieved by adding a layer to a substrate are numerous, examples of such functional properties include strengthening, scratch resistance and chemical resistance. Accordingly, one or more embodiments may involve providing a nitrided alkali-free glass layer on a substrate such as another glass.

For example, an oxide glass, such as Gorilla® Glass, which is available from Corning Incorporated, has been widely used in consumer electronics products. Such glass is used in applications where the strength of conventional glass is insufficient to achieve desired performance levels. Gorilla® Glass is manufactured by chemical strengthening (ion exchange) in order to achieve high levels of strength while maintaining desirable optical characteristics (such as high transmission, low reflectivity, and suitable refractive index). Strengthened glass through ion exchange (IX) techniques can produce high levels of compressive stress in the treated glass, as high as about 400 to 1000 MPa at the surface. However, Gorilla® Glass is an alkali glass, and processing of alkali glasses in certain fabrications, such as ITO "touch" applications and displays, may not be desirable. One or more layers of nitrided alkali-free glass may be applied to a substrate such as Gorilla® Glass to provide a device having increased strength, scratch resistance and chemical durability.

Experimental Results

Samples of glass sheets (designated sample A and sample E) having dimensions of 50 mm×50 mm×1 mm or 0.7 mm thickness were placed in a 0.25 liter stainless steel vessel, the vessel was sealed air tight, purged with ammonia gas (product code AMAH35, Empire Airgas, Elmira, N.Y.), then heated to set temperatures, pressures, ammonia flow rate (in standard cubic centimeters per minute, sccm) and for times as described below in Table 2. The glass compositions were as follows: glass A was pure fused silica (100% $SiO_2$); and glass E, a non-alkali aluminosilicate, including approximately in weight percent $SiO_2$ (63%), $Al_2O_2$ (17%), $B_2O_3$ (11%), CaO (7%), MgO (1%), SrO (1%).

TABLE 2

| Temperature, degrees C. | Pressure, psig | Flow rate, sccm | Time, days |
|---|---|---|---|
| 200 | 100 | 30-40 | 11 |
| 300 | 100 | 30-40 | 7 |
| 350 | 100 | 30-40 | 14 |
| 475 | 100 | 30-40 | 4 |
| 600 | 100 | 30-40 | 5 |

Samples of glass A and glass E before and after exposure to ammonia (Table 2) were characterized by Secondary Ion Mass Spectroscopy (SIMS). With reference to FIG. 4, the data for glass A (pure silica) show that the silica glass was nitrided (i.e., contained nitrogen, N) from about 0.1 wt. % to about 2 wt. % N at the near surface (first 20-50 nm), and 0.02 to about 0.16 wt. % N at 500 nm depth, and the N was doped to greater than 3 microns, depending on the conditions. Higher N incorporation and deeper depth was found with higher temperatures (e.g., 600° C. vs. 300° C.). With reference to FIG. 5, the data for glass E (an alkali-free glass) show that the alkali-free glass was nitrided (i.e., contained nitrogen, N) from about 10 wt. % to about 14 wt. % N at the near surface (first 10-100 nm), and 0.1 to about 1.4 wt. % N at 500 nm depth, and the N was doped to greater than 2 microns, depending on the conditions. Surprisingly, we found the non-alkali glass to incorporate significantly more N (about ten fold) than the silica glass treated under similar conditions. While not being bound by a single theory, it is believed the higher N incorporation could be due to high molar volume in the non-alkali glass. In some embodiments, these glasses have molar volume greater than 25 $cm^3$/mole, in some embodiments, these glasses have molar volume greater than 26 $cm^3$/mole. Also, surprisingly, higher maximum weight percent N incorporation was found with lower temperature (e.g., 475° C. vs. 600° C.), while deeper depth N incorporation and was found with higher temperatures (e.g., 600° C. vs. 475° C.). Increasing the temperature, e.g., up to 800° C., 1000° C., 1200° C. or greater, would be expected to further increase the N incorporation both in depth.

Figure 6:
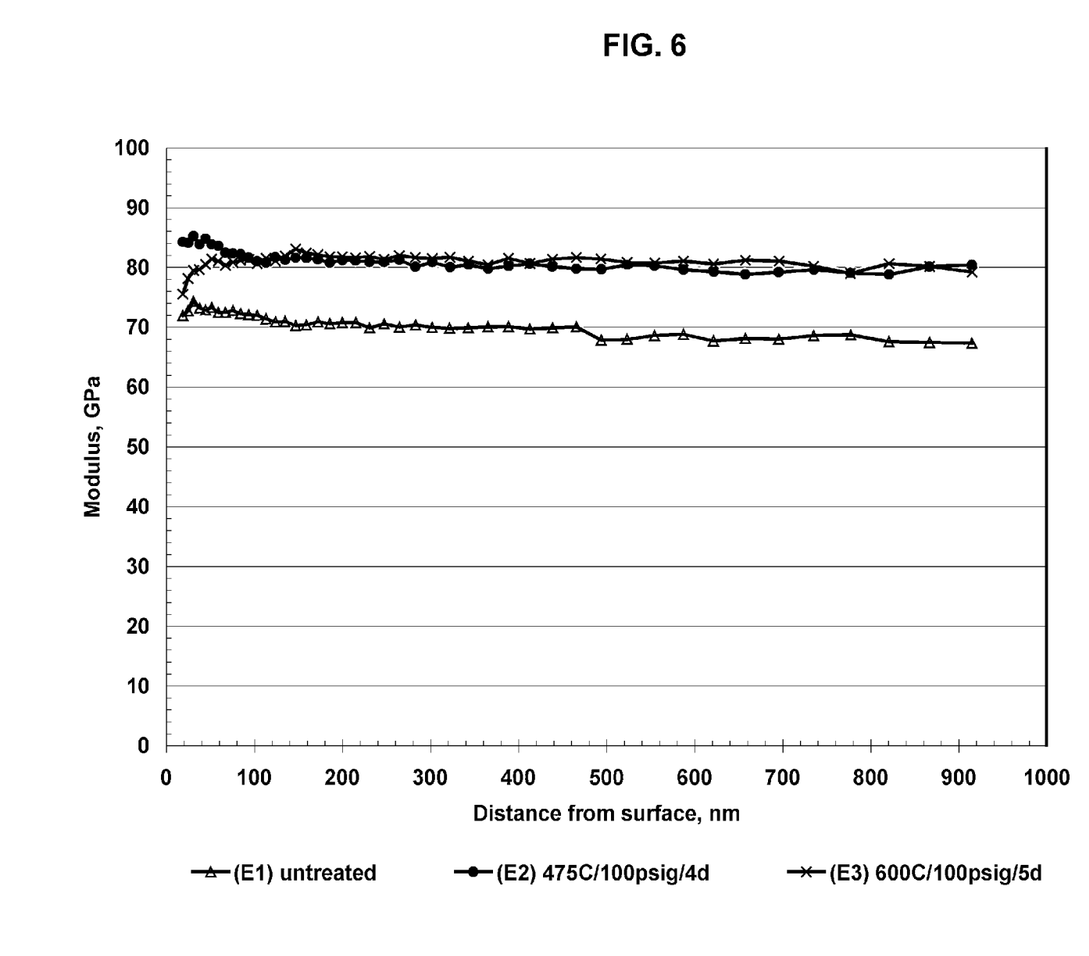
FIG. 6 is a graphical depiction of Young's modulus as a function of depth for a non-alkali aluminosilicate sheet (Glass E) treated with $NH_3$.
Figure 7:
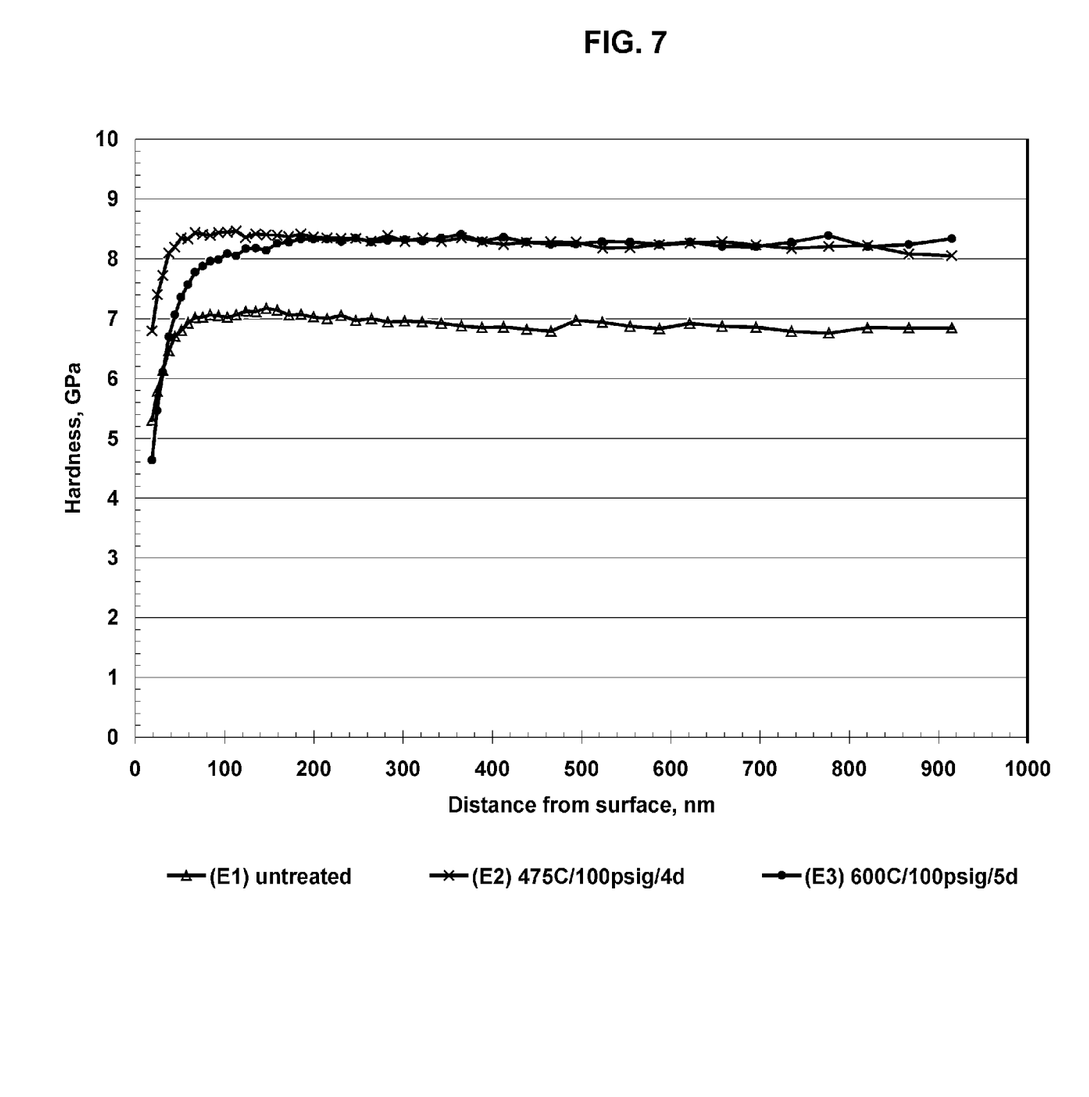
FIG. 7 is a graphical depiction of hardness as a function of depth for a non-alkali aluminosilicate sheet (Glass E) treated with $NH_3$.

With reference to FIGS. 6 and 7, samples of glass E (non-alkali aluminosilicate) before (sample E1) and after (samples E2 and E3) exposure to ammonia according to the conditions in Table 2 were characterized at room temperature (about 20-25° C., and 50% RH) using an Agilent Nano Indenter G200 (Agilent Technologies, Inc. USA) for Young's modulus and hardness as a function of depth from the surface. Variation in modulus and hardness within about the first 50-80 nm from the surface are an artifact from this measurement technique. The results show that the modulus and hardness increased by about 17% and 19%, respectively for the glass samples that were exposed to the ammonia treatment (E2 and E3) as compared to the unexposed as-received glass sample (E1).

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application.

What is claimed is:

1. An article comprising an alkali-free glass composition comprising (in weight %) 50≤$SiO_2$≤80%, 2≤$Al_2O_3$≤17%, 8≤$B_2O_3$≤36%, and greater than or equal to 2% and less than or equal to 25% of at least one of CaO, MgO, BaO, SrO or ZnO, the alkali-free glass composition comprising a surface diffusion layer comprising greater than 0.2 weight % N, wherein the surface diffusion layer increases the Young's modulus of the article.

2. The article according to claim 1 wherein a summed amount of CaO, MgO, BaO, SrO and ZnO is in the range of 9-24 weight %.

3. The article according to claim 1 comprising a molar volume greater than 26 $cm^3$/mole.

4. The article according to claim 1 comprising a molar volume greater than 27 $cm^3$/mole.

5. The article according to claim 1 wherein the surface layer comprises a thickness of greater than 1 nm.

6. The article according to claim 1 wherein the surface layer comprises a thickness of greater than 10 nm.

7. The article according to claim 1 wherein the surface layer comprises a thickness of greater than 100 nm.

8. The article according to claim 1 wherein the surface layer comprises a thickness of greater than 1 micron.

9. The article according to claim 1 wherein the surface layer comprises a thickness of greater than 10 microns.

10. The article according to claim 1 wherein the surface layer comprises greater than 1 weight % N.

11. The article according to claim 1 wherein the surface layer comprises at least 2 weight % N.

12. The article according to claim 1 wherein the surface layer comprises at least 4 weight % N.

13. The article according to claim 1 wherein the surface layer comprises at least 8 weight % N.

14. The article according to claim 1 wherein the surface layer comprises at least 14 weight % N.

15. The article according to claim 1 comprising a glass sheet.

16. The article according to claim 1 comprising a 3D glass sheet.

17. The article according to claim 1 wherein the glass composition is tempered.

18. The article according to claim 1, wherein the Young's modulus increases by at least about 17%.

19. The article according to claim 1, wherein the Young's modulus is at least about 72.7 GPa.

20. The article of according to claim 19, wherein the Young's modulus is in a range from about 72.7 GPa to about 137.7 GPa.

21. An article comprising an alkali-free glass composition comprising (in weight %) $65 \leq SiO_2 \leq 75\%$, $7 \leq Al_2O_3 \leq 13\%$, $5 \leq B_2O_3 \leq 36\%$, $5 \leq CaO \leq 15\%$, $0 \leq BaO \leq 5\%$, $0 \leq MgO \leq 3\%$ and $0 \leq SrO \leq 5\%$, the composition comprising a surface diffusion layer comprising greater than 0.2 weight % N, wherein the surface diffusion layer increases the Young's modulus of the article.

22. The article according to claim 21 wherein the surface layer comprises a thickness of greater than 1 nm.

23. The article according to claim 21 wherein the surface layer comprises a thickness of greater than 10 nm.

24. The article according to claim 21 wherein the surface layer comprises a thickness of greater than 100 nm.

25. The article according to claim 21 wherein the surface layer comprises a thickness of greater than 1 micron.

26. The article according to claim 21 wherein the surface layer comprises greater than 1 weight % N.

27. The article according to claim 21 wherein the surface layer comprises at least 2 weight % N.

28. The article according to claim 21 wherein the surface layer comprises at least 4 weight % N.

29. The article according to claim 21 wherein the surface layer comprises at least 8 weight % N.

30. The article according to claim 21 wherein the surface layer comprises at least 14 weight % N.

31. The article according to claim 21, wherein the Young's modulus increases by at least about 17%.

32. The article according to claim 21, wherein the Young's modulus is at least about 72.7 GPa.

33. The article of according to claim 32, wherein the Young's modulus is in a range from about 72.7 GPa to about 137.7 GPa.

34. An article comprising an alkali-free glass composition comprising (in weight %) $40 \leq SiO_2 \leq 70\%$, $0 \leq Al_2O_3 \leq 20\%$, $1 \leq P_2O_5 \leq 15$, $0 \leq B_2O_3 \leq 25\%$, and greater than or equal to 0% and less than or equal to 25% of at least one of CaO, MgO, BaO, SrO or ZnO, the composition comprising a surface diffusion layer comprising greater than 0.2 weight % N, wherein the surface diffusion layer increases the Young's modulus of the article.

35. The article according to claim 34 wherein the surface layer comprises a thickness of greater than 1 nm.

36. The article according to claim 34 wherein the surface layer comprises greater than 1 weight % N.

37. The article according to claim 34, wherein the Young's modulus increases by at least about 17%.

38. The article according to claim 34, wherein the Young's modulus is at least about 72.7 GPa.

39. The article of according to claim 38, wherein the Young's modulus is in a range from about 72.7 GPa to about 137.7 GPa.

* * * * *